May 7, 1968 F. POTAIN 3,381,410
FLOWERPOTS

Filed Feb. 15, 1966 2 Sheets-Sheet 1

INVENTOR
Faustin Potain
BY Alexander & Dowell
ATTORNEYS

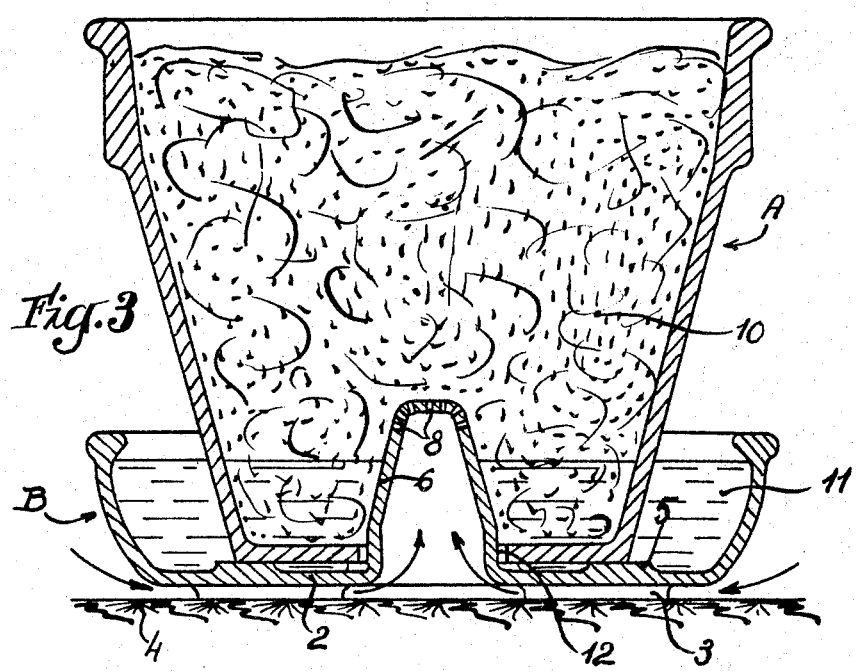
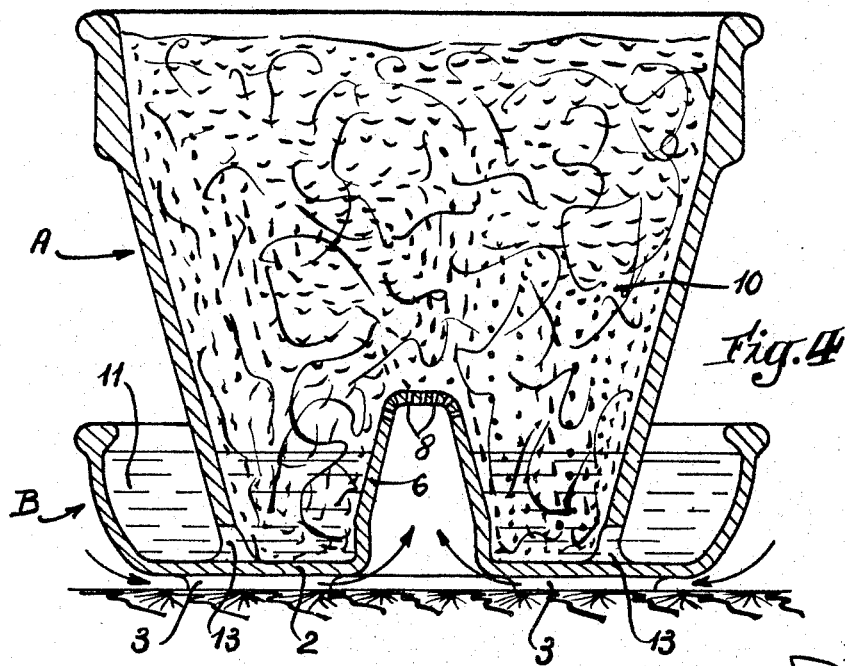

United States Patent Office 3,381,410
Patented May 7, 1968

3,381,410
FLOWERPOTS
Faustin Potain, La Clayette, Saone-et-Loire, France
Filed Aug. 15, 1966, Ser. No. 572,285
2 Claims. (Cl. 47—38)

ABSTRACT OF THE DISCLOSURE

A flowerpot comprising a water bowl having feet on its underside, said feet spacing said bowl from any supporting surface, and an aerating head projecting upwardly from the base of said receptacle to a level above the level of the top of said bowl, said aerating head being open on the underside of said bowl, and having an imperforate wall below the level of the top of said bowl and a perforate wall above the level of the top of said bowl, and an earth receptacle separate from said bowl, said earth receptacle having a base defining a hole into which said aerating head is received, bosses between said bowl and the base of said receptacle being larger than that portion of said aerating head which passes through said hole when said receptacle is fitted within said bowl to provide a communication passage between the interior of said bowl and the interior of said receptacle.

Description of invention

The present invention relates to improvements to flowerpots and it is more particularly concerned with the case of a pot capable of conserving for a long time the required humidity within the earth which it contains and in which any plants are planted.

Flowerpots are known which are fitted with devices allowing their bases to be left constantly steeped in wa ter. The humidity of the earth which results from this is then excessive and the lack of aeration causes rotting of the roots.

The invention aims at eliminating this disadvantage by creating a flowerpot which simultaneously ensures the aeration of the earth which it contains and its retention at a satisfactory degree of humidity.

A flowerpot according to the invention comprises, on the one hand, a pot proper of which the bottom has a large perforation in its centre, and, on the other hand, a bowl in the middle of which projects a head, perforated in its top, and of which the base diameter is smaller than the diameter of the central perforation of the pot, bosses being provided on the two sides of the bottom of the bowl in order to allow the free circulation of water and air.

It is sufficient to pour water in the bowl and to put in it the pot, of which the bottom fits over the perforated head of the bowl, to allow water to penetrate to the inside of the pot, whilst the exterior air circulates freely at the bottom of the bowl to come into contact with the earth in the pot, above the level of the water, through the perforations of the head. The best conditions of aeration and humidity for growing decorative or similar plants are thus assured.

The accompanying drawings, illustrate one construction which is given by way of example, for better understanding of the invention, its characteristics, and the advantages it is able to procure.

In the drawings:

FIGURE 3 is an axial section of the assembly of the device whilst it is working, and FIGURE 4 corresponds to FIGURE 3 for a possible constructional variant in a single part of a flowerpot according to the invention.

Figure 1:
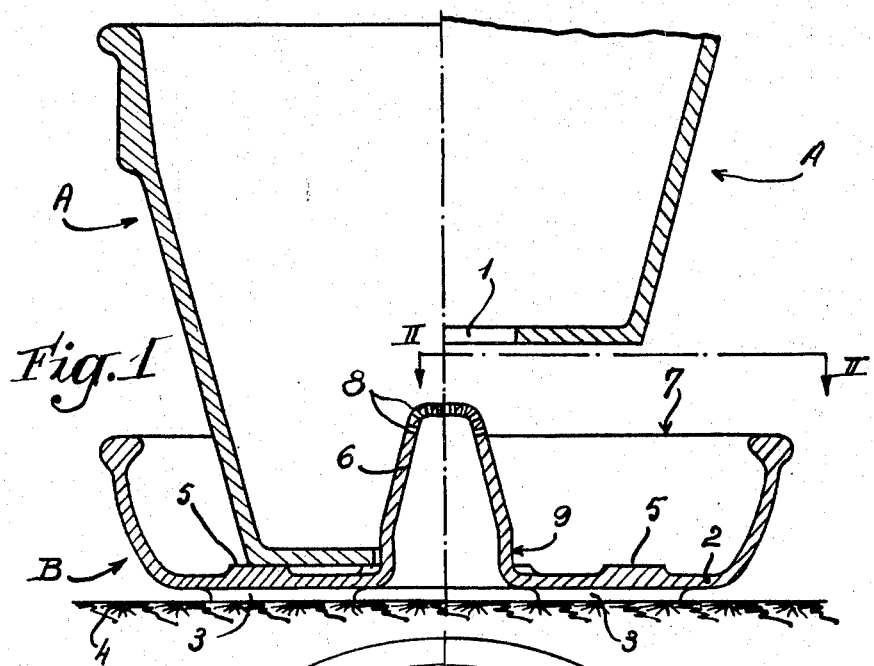
FIGURE 1 is an axial section of an assembly according to the invention showing to the right the pot before it is put into place, and in the left half, the assembled device.
Figure 2:
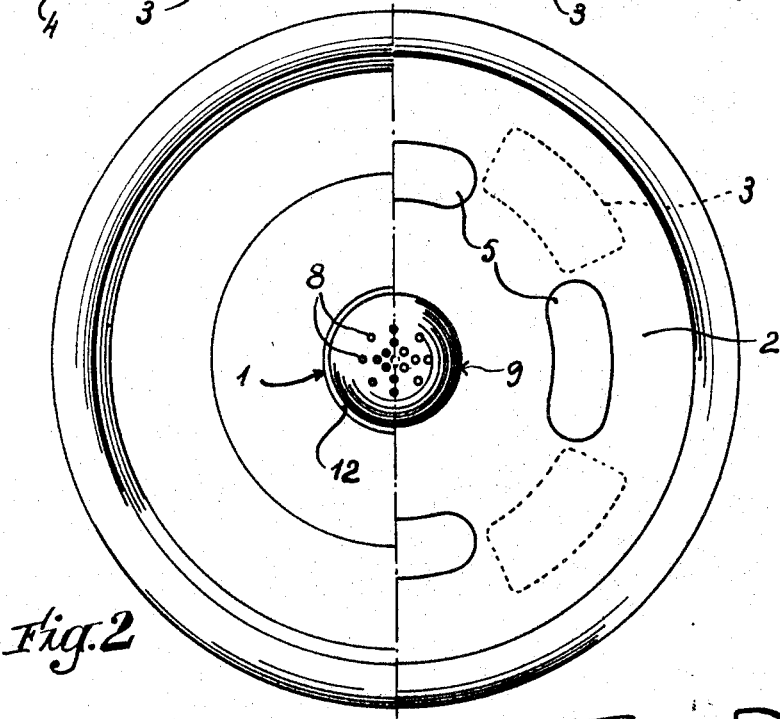
FIGURE 2 is a plan view with a half in section along the line II—II (FIGURE 1)

The flowerpot shown in FIGURES 1 to 3 comprises two main components which are made separately, that is a pot proper A and a bowl B. Each of these two parts may be made from earthenware, from plastics, or from any other known material.

The pot A has the usual shape of a flowerpot, with the single peculiarity of having a bottom pierced in its centre by an opening 1 of relatively large diameter. It has been supposed in the drawings that the pot A has the shape of a truncated cone, but it could very obviously be prismatic, in the shape of a pyramid, or, more generally, of any desired form.

The bowl B includes a bottom 2 below which project some flat bosses 3 which act as very short feet and allowing their bases to be left constantly steeped in water. example, the ground, a table, or a windowsill.

Above the interior face of the bottom 2 there likewise project some flat bosses 5 which are arranged around the axis of the bowl. In the example shown in FIGURES 1 to 3, the bottom 2 has four interior bosses 5 and four exterior bosses 3, arranged so that the interior and exterior bosses are staggered.

Finally, the bottom 2 of the bowl B forms in its centre a hollow aeration head 6 which projects upwards and of which the top, which projects above the horizontal plane 7 formed by the upper edge of the bowl B, is pierced by a series of perforations 8. This head 6 has at its base an external diameter 9 which is smaller than the diameter of the opening 1 of the pot A. In addition, the head 6 preferably has the general shape of a truncated cone to facilitate the placing of the pot A on it.

The operation is as follows:

The pot A is engaged above the aeration head 6 until it comes to rest on the bosses 5, then it is filled with earth 10 (FIGURE 3) and plants, not shown, are planted in it in the usual way. Then water 11 is poured into the bowl B. The water 11 therefore surrounds the base of the pot A to the interior of which it penetrates freely through the annular interstice 12 which surrounds the base of the head 6, at the level of the opening 1. The earth of the pot A is thus assured a satisfactory degree of humidity.

In addition, the exterior air circulates freely under the bottom 2 of the bowl B, passing between the bosses 3, as shown by the arrows in FIGURE 3. This air fills the hollow interior space of the head 6, and it penetrates as far as the earth 10 of the pot through the perforations 8. These latter being in any case placed above the level of the water 11, a suitable aeration of the earth 10 is thus assured.

In the alternative construction shown in FIGURE 4, the flowerpot according to the invention is made in a single piece, and it unites into one the pot A and the bowl B. In this case, the bottom 2 is common to these two components, and the circulation of water is made through lateral openings 13 arranged around the base of the pot A. As regards the circulation of air, it is made as previously, by passing between the bosses 3 provided under the bottom 2, and filling the interior of the hollow head 6 of which the top is perforated.

It must moreover be understood that the preceding description has been given only by way of example and that it in no way limits the scope of the invention which will not be avoided by replacing the described constructional details by any other equivalents.

In particular, the scope of the invention will not be avoided by making the two components A and B of the described flowerpot of any shape or colour whatever, or by using the most varied materials.

I claim:
1. A flowerpot comprising a water bowl having feet on its underside, said feet spacing said bowl from any supporting surface, and an aerating head projecting upwardly from the base of said receptacle to a level above the the level of the top of said bowl, said aerating head being open on the underside of said bowl, and having an imperforate wall below the level of the top of said bowl and a perforate wall above the level of the top of said bowl, and an earth receptacle separate from said bowl, said earth receptacle having a base defining a hole into which said aerating head is received, bosses between said bowl and the base of said receptacle said hole in the base of said receptacle being larger than that portion of said aerating head which passes through said hole when said receptacle is fitted within said bowl to provide a communication passage between the interior of said bowl and the interior of said receptacle.

2. A flowerpot according to claim 1, wherein said bowl and said receptacle are made in one piece and the wall of said receptacle defines at least one hole providing said communication passage.

References Cited

UNITED STATES PATENTS

| | | |
|---|---|---|
| 117,766 | 8/1871 | Gibson. |
| 2,550,602 | 4/1951 | Rothe _____ 47—34 |

FOREIGN PATENTS

| | | |
|---|---|---|
| 6,192 | 1906 | Australia. |
| 87,658 | 3/1922 | Austria. |

ROBERT E. BAGWILL, *Primary Examiner.*